United States Patent
Zheng et al.

(10) Patent No.: US 11,487,676 B2
(45) Date of Patent: *Nov. 1, 2022

(54) ADDRESS MAPPING IN MEMORY SYSTEMS

(71) Applicant: Rambus Inc., San Jose, CA (US)

(72) Inventors: Hongzhong Zheng, Sunnyvale, CA (US); James Tringali, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/953,230

(22) Filed: Nov. 19, 2020

(65) Prior Publication Data
US 2021/0141737 A1  May 13, 2021

Related U.S. Application Data (63) Continuation of application No. 16/134,758, filed on Sep. 18, 2018, now Pat. No. 10,853,265, which is a continuation of application No. 13/652,386, filed on Oct. 15, 2012, now abandoned.

(60) Provisional application No. 61/548,607, filed on Oct. 18, 2011.

(51) Int. Cl.
*G06F 12/1036* (2016.01)
*G06F 12/02* (2006.01)

(52) U.S. Cl.
CPC ...... *G06F 12/1036* (2013.01); *G06F 12/0238* (2013.01); *G06F 2212/7211* (2013.01); *Y02D 10/00* (2018.01)

(58) Field of Classification Search
CPC ......... G06F 12/0238; G06F 2212/7211; G06F 12/1036; Y02D 10/00
USPC .................................................. 711/206, 203
See application file for complete search history.

(56) References Cited

U.S. PATENT DOCUMENTS

| | | | |
|---|---|---|---|
| 5,390,308 A | 2/1995 | Ware et al. | |
| 5,943,283 A * | 8/1999 | Wong | G06F 21/79 365/230.01 |
| 6,954,837 B2 | 10/2005 | Woo et al. | |
| 2008/0025136 A1 | 1/2008 | Rajan et al. | |
| 2008/0025506 A1 * | 1/2008 | Muraoka | G06F 12/1408 380/46 |
| 2008/0276035 A1 | 11/2008 | Hobson | |
| 2008/0320209 A1 | 12/2008 | Lee et al. | |
| 2010/0011156 A1 | 1/2010 | Yim et al. | |
| 2010/0153616 A1 | 6/2010 | Garratt | |
| 2010/0185805 A1 | 7/2010 | Chen et al. | |
| 2010/0205363 A1 | 8/2010 | Hwang et al. | |
| 2010/0250836 A1 | 9/2010 | Sokolov et al. | |
| 2011/0145485 A1 | 6/2011 | Chun et al. | |
| 2011/0153908 A1 | 6/2011 | Schaefer et al. | |
| 2011/0307664 A1 | 12/2011 | Paver et al. | |
| 2012/0233381 A1 | 9/2012 | Tucek et al. | |

* cited by examiner

*Primary Examiner* — David Yi
*Assistant Examiner* — Zubair Ahmed
(74) *Attorney, Agent, or Firm* — Lance Kreisman; Peninsula Patent Group (57) ABSTRACT

A memory system includes an address mapping circuit. The address mapping circuit receives an input memory address having a first set of address bits. The address mapping circuit applies a logic function to the input memory address to generate a mapped memory address. The logic function uses at least a subset of the first set of address bits in two separate operations that respectively determine two portions of the mapped memory address.

20 Claims, 7 Drawing Sheets

ADDRESS MAPPING IN MEMORY SYSTEMS

CROSS REFERENCE TO RELATED APPLICATION

This patent application is a Continuation of U.S. application Ser. No. 16/134,758, filed Sep. 18, 2018, titled "Address mapping in Memory Systems", which is a Continuation of U.S. application Ser. No. 13/652,386, filed Oct. 15, 2012, titled "Address mapping in Memory Systems", which claims the benefit of U.S. provisional patent application 61/548,607, filed Oct. 18, 2011, all of which are incorporated by reference herein in their entirety.

TECHNICAL FIELD

This disclosure relates to memory systems, and more particularly, to techniques for address mapping in memory systems.

BACKGROUND

A processor circuit generates memory addresses for read and write requests to a memory circuit. A processor circuit may map logical addresses and/or virtual addresses, as used by software applications and an operating system, to device addresses that correspond to memory locations in the memory circuit.

Some types of memory cell technologies such as Flash, phase change memory (PCM), and resistive random access memory (RRAM) have less endurance to repeated writes to the same memory locations than dynamic random access memory (DRAM) and static random access memory (SRAM). For example, an RRAM circuit may be able to withstand a maximum of $10^9$ to $10^{13}$ write accesses, and a DRAM circuit may be able to withstand a maximum of about $10^{15}$ write accesses.

Some software applications, due to their structure or use, generate numerous write requests targeting a small subset of logical addresses, and therefore a small subset of device addresses if a cache is ineffective in insulating main memory from the writes. Numerous writes to a small percentage of memory cells in a memory circuit that has limited write endurance may substantially reduce the service life of the memory circuit even though the overall average writes/cell for the circuit is still low, where service life ends when the most-used cells begin to wear out.

Wear leveling techniques have been used to prolong the service life of some types of memory circuits. A wear leveling technique converts a nominal device address for each write request to a physical device address using a process that, over time, shifts the same nominal device address to different physical device addresses. For example, some wear leveling techniques periodically move blocks of nominal device addresses to new blocks of physical device addresses. This causes the long-term effect of high write usage for a nominal device address to be spread over a larger number of physical memory cells. Wear leveling techniques typically increase the access latency and the energy consumption of a memory system.

DETAILED DESCRIPTION

According to some embodiments, an address mapping circuit applies a logic function to an input memory address to generate a mapped memory address. The input memory address is associated with an access to a memory circuit such as a write request. The logic function includes at least one function other than a fixed shift operation. The address mapping circuit maps each allowed input memory address to a unique mapped memory address. In an exemplary embodiment, the logic function is a hash function.

In some embodiments, a wear leveling technique is applied to the mapped memory address to generate a wear-leveled memory address in a wear-leveled memory space. The memory circuit accesses one or more memory cells at memory locations identified by the wear-leveled memory address, which is typically a physical address. The address mapping circuit may increase the efficiency of the wear leveling technique to increase the performance of a memory system and/or to reduce the power consumption of the memory system.

In the present disclosure, the term "memory address" is used to refer to various address expressions within a memory system, but does not require that each such address expression be a physical address. Further, the meaning of the term "physical address" requires some context—a memory address provided by a memory controller to the device interface of a memory device could be a "physical address" as viewed from the memory controller. The same address could be a "logical address" when viewed from inside the memory device, when the device performs address mapping according to an embodiment prior to accessing its internal arrays. Accordingly, the terms "memory address" and "physical address," as used herein, should be understood by those skilled in the art to be inclusive of a variety of alternate address expressions that may exist as an address traverses a memory system.

In some embodiments, the address mapping circuit increases the total number of different rows of memory cells and/or columns of memory cells that are accessed in the memory circuit in response to a given set of requests to access the memory circuit. In some embodiments, the address mapping circuit reduces the total number of accesses to at least some of the rows of memory cells, to at least some of the columns of memory cells, and/or to at least some of the memory cells in the memory circuit to increase the total number of accesses to the memory circuit that can be performed during the service life of the memory circuit.

Figure 1A:
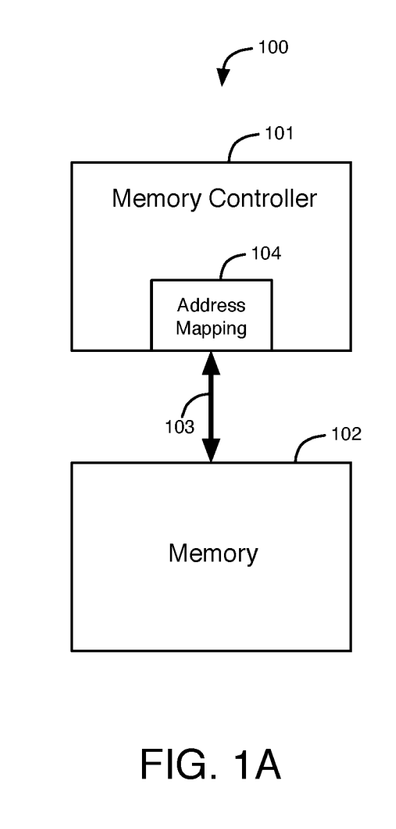
FIG. 1A illustrates an embodiment of a memory system having an address mapping circuit in a memory controller circuit.

FIG. 1A illustrates a memory system 100 having an address mapping circuit located in a memory controller circuit. Memory system 100 includes memory controller circuit 101, memory circuit 102, and bus 103. Memory controller circuit 101 includes address mapping circuit 104. Memory controller circuit 101 receives requests from other functional units (not shown) to access memory circuit 102. The requests include read requests and write requests. As an example, memory controller circuit 101 may be part of a processor, and the requests to access memory circuit 102 may be generated by other circuitry in the processor. Memory controller circuit 101 includes an interface to communicate with memory circuit 102. Signals associated with the requests are transmitted through bus 103 between memory controller circuit 101 and memory circuit 102.

In some embodiments, memory controller circuit 101 is in a first integrated circuit, and memory circuit 102 is in a second integrated circuit separate from the first integrated circuit. For example, memory controller circuit 101 may be part of a larger processor integrated circuit, or memory controller circuit 101 may itself be an integrated circuit. In other embodiments, memory controller circuit 101 and memory circuit 102 are in the same integrated circuit.

Figure 1B:
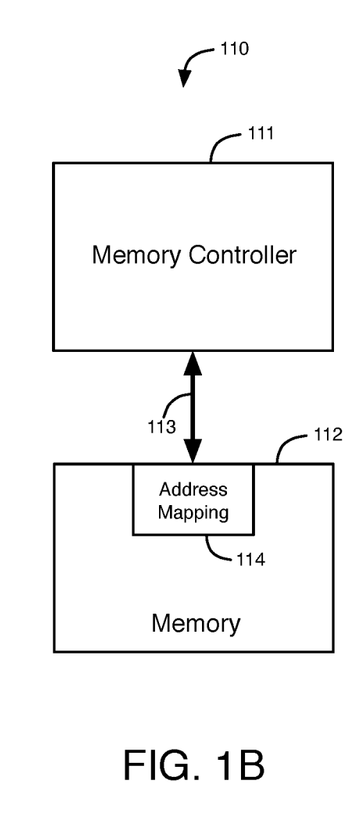
FIG. 1B illustrates an embodiment of a memory system having an address mapping circuit in a memory circuit.

FIG. 1B illustrates a memory system 110 having an address mapping circuit located in a memory circuit. Memory system 110 includes memory controller circuit 111, memory circuit 112, and bus 113. In the embodiment of FIG. 1B, address mapping circuit 114 is located in memory circuit 112. Signals associated with read and write requests are transmitted through bus 113 between memory controller circuit 111 and memory circuit 112. Memory controller circuit 111 and memory circuit 112 may be in separate integrated circuits or in the same integrated circuit.

Memory circuits 102 and 112 may include any memory cell technology such as, for example, synchronous dynamic access memory (DRAM), static random access memory (SRAM), Flash, etc. As more specific examples, memory circuits may be double data rate (DDR) SDRAM, extreme data rate (XDR), or Mobile XDR devices.

The memory controller circuit 101 or 111 may be, for example, one part of a larger processor integrated circuit, or connected by a bus to one or more processors. Examples of processor integrated circuits include mobile applications processors, application specific integrated circuits (ASICs), graphics processing units (GPUs), field programmable gate arrays (FPGAs), and a system on chip (SoC), which may include processing cores or multimedia encode/decode functionality and multi-core processors as a sample set of examples. As another example, the memory controller circuit may include a processor. As yet another example, the memory controller circuit may be in an integrated circuit that includes a separate processor.

Figure 2:
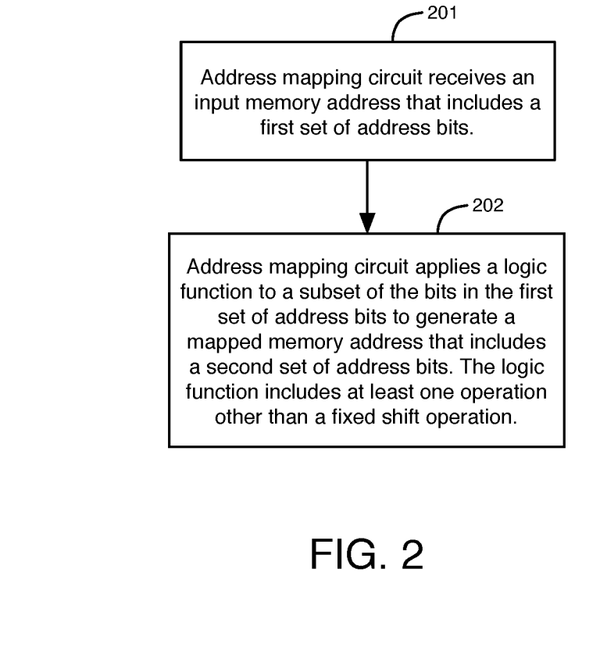
FIG. 2 is a flow chart illustrating operations that are performed on memory addresses for requests to access memory locations in a memory circuit.

FIG. 2 is a flow chart illustrating operations that are performed on memory addresses corresponding to requests to access memory locations in a memory circuit. In operation 201, the address mapping circuit (either 104 or 114 in the respective embodiments of FIG. 1A or 1B) receives an input memory address that includes a first set of address bits. The input memory address typically corresponds to a request to access one or more memory cells in the respective memory circuit 102 or 112 of FIG. 1A or 1B. The input memory address may, for example, correspond to a request to write data, read data, or erase data at addressed memory cells in the respective memory circuit 102 or 112.

In operation 202, the address mapping circuit 104 or 114 applies a logic function to a subset of the bits in the first set of address bits in the input memory address to generate a mapped memory address that includes a second set of address bits. The logic function applied in operation 202 includes at least one operation other than a fixed shift operation, but may also include one or more fixed shift operations. The logic function has a one-to-one mapping from the input memory address to the mapped memory address. In some embodiments, the logic function performed by address mapping circuit 104 or 114 in operation 202 includes a hash function. The address mapping circuit 104 or 114 applies operation 202 to the input memory address associated with each request to access the respective memory circuit 102 or 112. Various techniques described herein use some bits of the input memory address to determine more than one corresponding bit segment of the mapped memory address.

In some embodiments, the roles of at least some bits that typically indicate row and column in the input memory address are switched. In some embodiments, a portion of the mapped memory address is formed from an XOR operation between selected column and row bits from the input memory address. In other embodiments, a portion of the mapped memory address is formed in part from a randomly generated mapping of a portion of the input memory address. In an alternative embodiment additionally employing a fixed shift, a fixed shift operation treats a group of bits as a group and arithmetically shifts the group by a constant amount. For example, a fixed shift operation may add 30 to a column address portion of a memory address.

In some embodiments, the memory circuit 102 or memory controller 101 (FIG. 1A), or the memory circuit 112 (FIG. 1B) applies a wear leveling technique to the mapped memory address generated by the address mapping circuit 104 or 114, respectively, to generate a wear-leveled memory address. One or more memory cells are accessed in the memory circuit 102 or 112 at one or more memory locations based on the wear-leveled memory address. For example, the memory circuit 102 or 112 may store data in a memory cell at the memory location identified by the wear-leveled memory address in response to a write request received from the respective memory controller circuit 101 or 111.

The address mapping techniques shown in and described with respect to FIG. 2 and other embodiments shown and described herein can be used prior to, concurrently with, or after application of a wear leveling technique in a combined technique for generating a final memory address. For example, the address mapping techniques shown and described herein can be used to generate an address input to, or accept an input address from, the wear leveling techniques described in commonly-assigned U.S. patent application 61/548,089, filed Oct. 17, 2011, which is incorporated by reference herein in its entirety.

The address mapping techniques of FIG. 2 may, for example, increase the total number of rows of memory cells and/or columns of memory cells that are accessed in a memory circuit by an application operating (from the application's point of view) on a limited range of memory addresses in the application's memory address space. In some embodiments, the address mapping techniques of FIG. 2 thus decrease the total number of accesses to at least some of the rows of memory cells, to at least some of the columns of memory cells, and/or to at least some of the memory cells in the memory circuit due to operation of the application. This decrease allows the memory circuit to function in response to a larger aggregate number of accesses to the memory circuit, and extends the circuit's usable lifespan. In some embodiments, the address mapping techniques of FIG. 2 are used in combination with a wear leveling technique to achieve or to enhance these benefits.

The address mapping techniques of FIG. 2 may, for example, allow a wear leveling technique to make less frequent changes to the memory address space to achieve the same total number of accesses to a memory circuit during its service life. The address mapping techniques of FIG. 2 may, for example, improve the ability of a wear leveling technique to more efficiently spread accesses to a larger number of memory cells in a memory circuit. As a result, the address mapping techniques of FIG. 2 can, for example, increase the performance of the memory system and/or reduce the power and energy consumption of the memory system.

Figure 3:
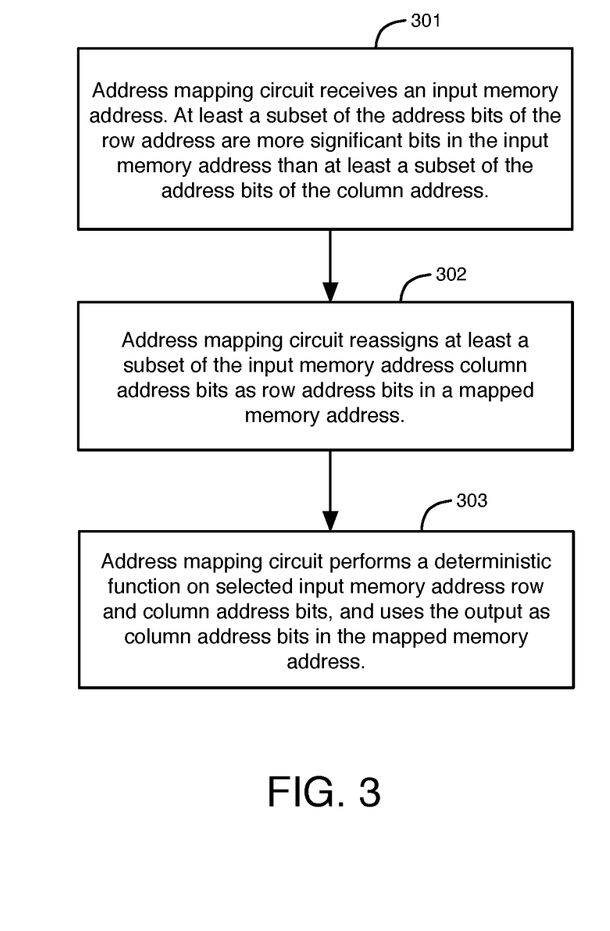
FIG. 3 is a flow chart illustrating exemplary address mapping operations that are performed on memory addresses associated with requests to access memory cells in a memory circuit.

FIG. 3 is a flow chart illustrating exemplary address mapping operations that can be performed on memory addresses associated with requests to access memory cells in a memory circuit. In the embodiment of FIG. 3, memory circuits 102 and 112 are memory array circuits that include memory cells arranged in rows and columns. In operation 301, address mapping circuit 104 or 114 receives an input memory address associated with a request to access the respective memory circuit 102 or 112. The input memory address includes a row address portion and a column address portion. The row address portion traditionally identifies a row of memory cells in the respective memory circuit 102 or 112, and is thus comprised of the most significant bit positions in the input memory address. The column address portion traditionally identifies a column of memory cells (the meaning of "column" in this context is understood to include multiple physical columns sharing the same memory column address, where more than one bit is transferred per access) in the respective memory circuit 102 or 112, and is thus comprised of a bit group occupying less significant bit positions than the row address bits.

In an embodiment, a processor or memory controller 101 or 111 generates the input memory address received in operation 301, corresponding to a request to access the respective memory circuit 102 or 112 using cache line interleaving. A processor or memory controller may, for example, use cache line interleaving to store a contiguous cache line of data in different banks of memory cells in the memory circuit in order to increase access concurrency to the banks of memory cells in the memory circuit. In this example, where the least significant bit positions of a memory address are mapped to a bank address, the lower order bits are untouched by the address mapping circuit, thus preserving cache line interleaving performance. In other examples that do not use cache line interleaving, the least significant bit positions can be assigned as row and/or column address bits, or transformed through a logical function during the mapping operation, and other bits can be selected to correspond to bank address.

In operation 302, address mapping circuit 104 or 114 reassigns a portion of the input memory address bits. In one embodiment, the input memory address column address bits and a lower-bit-position group of the input memory address row address bits are reassigned to be the mapped memory address row address bits.

In operation 303, address mapping circuit 104 or 114 calculates the bits that will form the mapped memory address column address bits. In one embodiment, the column address bit positions are filled based on a hash function that combines selected row address bits and column address bits from the input memory address. The mapping operations, including the hash function, result in a one-to-one mapping from each allowed input memory address to a corresponding single allowed mapped memory address.

One example of a hash function that can be used by the address mapping circuit in operation 303 is an exclusive OR (XOR) logic function that calculates bit values for the hash-generated bit positions in the mapped memory address. In an embodiment, the address mapping circuit applies an XOR logic function, using as inputs the column address portion of the input memory address and a corresponding number of bits from the row address portion of the input memory address, to generate the mapped column address in operation 303. The address mapping circuit can, for example, XOR each bit $R_i$ of a selected set of bits in the input memory address row address with each bit $C_j$ of a selected set of bits in the input memory address column address to generate a corresponding bit $M_k$ in the mapped column address in operation 303, as shown in equation (1) below.

$$M_k = R_i \text{XOR} C_j \tag{1}$$

Equation (1) can be performed, e.g., simultaneously, on ranges of corresponding bits in the row and column addresses portions of the input memory address. The subscripts i, j, and k in equation (1) identify corresponding bits in each of the row, column, and mapped column addresses. As a specific example that is not intended to be limiting, if the input row address has 14 bits and the input column address has 8 bits, the address mapping circuit performs equation (1) on the 8 bits in the column address and the most significant 8 of the 14 bits in the row address to generate a 8-bit mapped column address in operation 303.

Another example of a hash function that can be used by the address mapping circuit in operation 303 is a randomized shift function. The randomized shift function used in operation 303 in this embodiment is shown below in equation (2).

$$\text{COL}M = (\text{COL} + \text{Rand}A[\text{ROW}]) \% G \tag{2}$$

In this embodiment, the address mapping circuit indexes into a randomized array of values, referred to as RandA in equation (2), by an index selected as some portion of the row address ROW in the input memory address to generate a pseudorandom offset for the input column address. The address mapping circuit then performs an arithmetic function (e.g., addition or subtraction) on the pseudorandom offset and the column address COL in the input memory address to generate a shifted column address. The address mapping circuit then performs a modulus function that divides the shifted column address by an integer number G to generate a remainder. The integer number G equals the number of unique addressable columns in a block of memory cells in the memory circuit. The remainder of the division is the mapped column address COLM.

In one embodiment, the offset index array is generated once at system initialization. For instance, in a simplified example where the table is indexed by three row address bits, the table contents are a shuffled version of the eight possible index values. The use of a random seed with a random number generator to initialize the array allows a unique mapping each time the system is restarted, which may further improve the spreading of cell wear across the memory.

In some embodiments, the memory circuit 102 or 112 applies a wear leveling technique to the mapped memory address generated in operation 303 to generate a wear-leveled memory address. The memory circuit 102 or 112 accesses at least one memory cell in the memory circuit at the memory location identified by the wear-leveled memory address.

In an embodiment, the operations of FIG. 3 cause spatially concentrated accesses to a memory circuit to be more evenly distributed in the memory circuit. The operations of FIG. 3 can, for example, cause a memory circuit to access a larger total number of rows and/or columns of memory cells in the memory circuit for a given size input row/column address region. As another example, the operations of FIG. 3 can reduce the total number of accesses to at least some of the rows of memory cells, to at least some of the columns of memory cells, and/or to at least some of the memory cells in the memory circuit to allow the memory circuit to function in response to a larger total number of memory accesses during its service life. In some embodiments, the operations of FIG. 3 are used in combination with a wear leveling technique to achieve or to enhance these benefits.

Figure 4A:
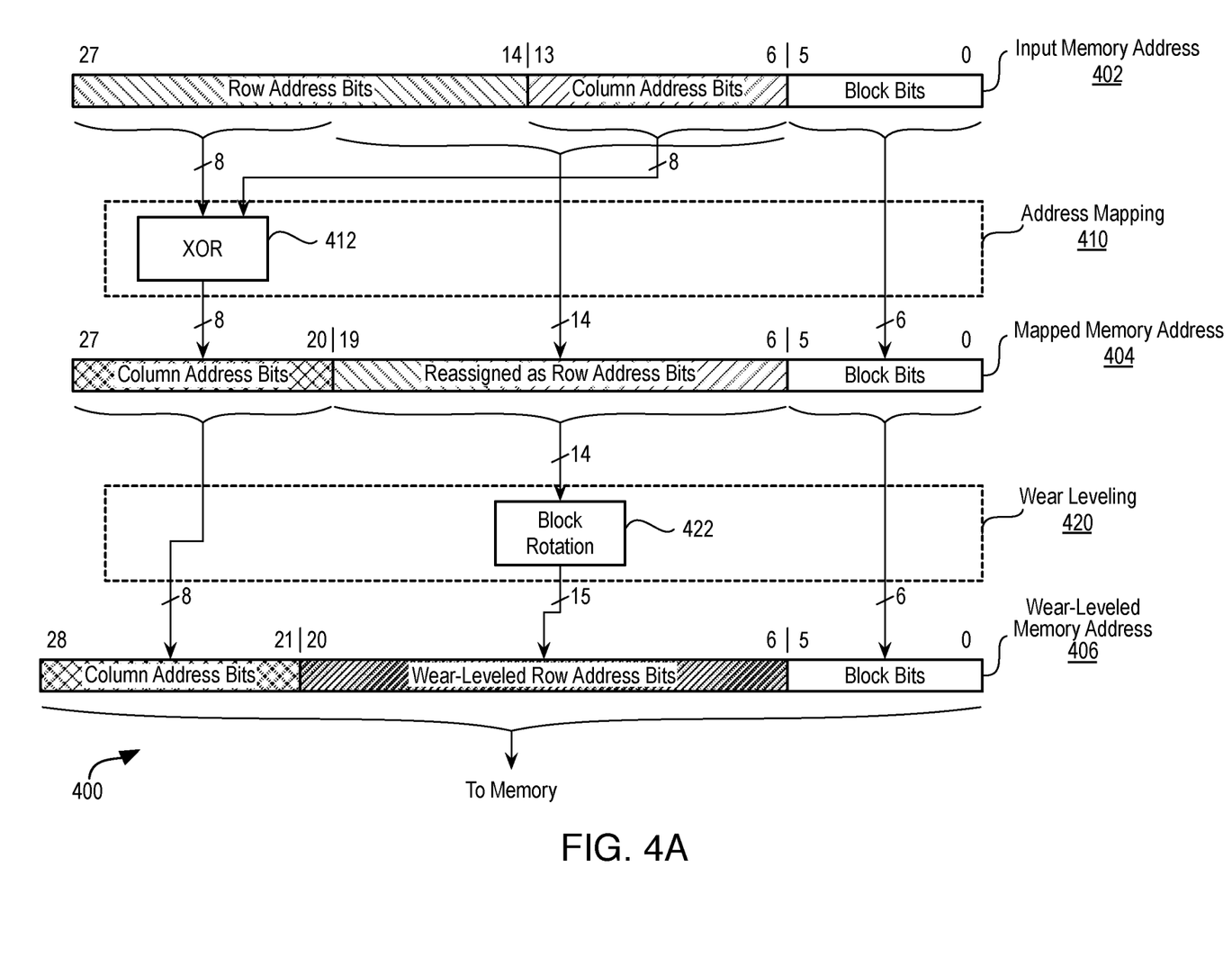
FIG. 4A contains a block diagram illustrating the operation of one embodiment including both address mapping and wear-leveling.

FIG. 4A contains a block diagram 400 illustrating the operation of one embodiment using both address mapping and block rotation wear leveling. An address mapping circuit 410 operates on an input memory address 402 to create a mapped memory address 404. A wear leveling circuit 420 operates on mapped memory address 404 to create a wear-leveled memory address 406, which is supplied to a memory as part of a memory operation. Note that in this case (other embodiments may differ), address mapping 410 and wear leveling block rotation 420 may operate in parallel, as neither changes the contents of the portion of the input address relied on by the other. Should operations proceed in parallel the intermediate mapped memory address 404 likely would not physically exist as a separate data entity in the circuit, although conceptually FIG. 4A still illustrates the operations performed. It is further noted that there are other elements of a wear leveling implementation that determine when and where to move blocks and perform block copies, modify a block address translation table, etc., that are not shown here.

In FIG. 4A, the exemplary input memory address 402 consists of 28 bits apportioned for use with a traditional cache-line-interleaved memory map. Least significant bit positions 0-5 are designated as block bits. More significant bit positions 6-13 are designated as an 8-bit column address. Most significant bit positions 14-27 specify a 14-bit row address.

Address mapping 410 performs a combination of reassignment and XOR remapping on input memory address 402. To preserve cache line interleaving relied on by a processor (for example), address mapping 410 does not perturb the block bits. Address mapping 410 reassigns the input memory address 402 column address bits, along with the less significant 6 row address bit positions of the input memory address 402, as a row address. Accordingly, mapped memory address 404 uses bit positions 6-19 of the input memory address 402 to indicate a row address. Address mapping 410 performs a bitwise XOR function 412 between the input memory address 402 column address bits 6-13 and the input memory address 402 row address bits 20-27. The XOR function 412 produces eight output bits as a column address for mapped memory address 404. The eight output bits are placed in bit positions 20-27 of mapped memory address 404.

Wear leveling 420 performs a combination of block rotation and a positional shift on mapped memory address 404. As with address mapping 410, the block bits are unaffected. Block rotation (not to be confused with the block bits) uses a scheme to periodically shift blocks of memory locations to different locations in physical memory. In one form of row block rotation (illustrated here), the physical memory contains more addressable rows than those that can be represented by a 14-bit row address. A block rotation function 422 consults the current block mapping table produced by wear leveling, which translates the 14-bit row address described in input bits 6-19 into a 15-bit wear-leveled row address (shown in wear-leveled memory address 406 in output bit positions 6-20). The output wear-leveled address 406 also contains the mapped memory address 404 column address, reproduced in bit positions 21-28.

Figure 4B:
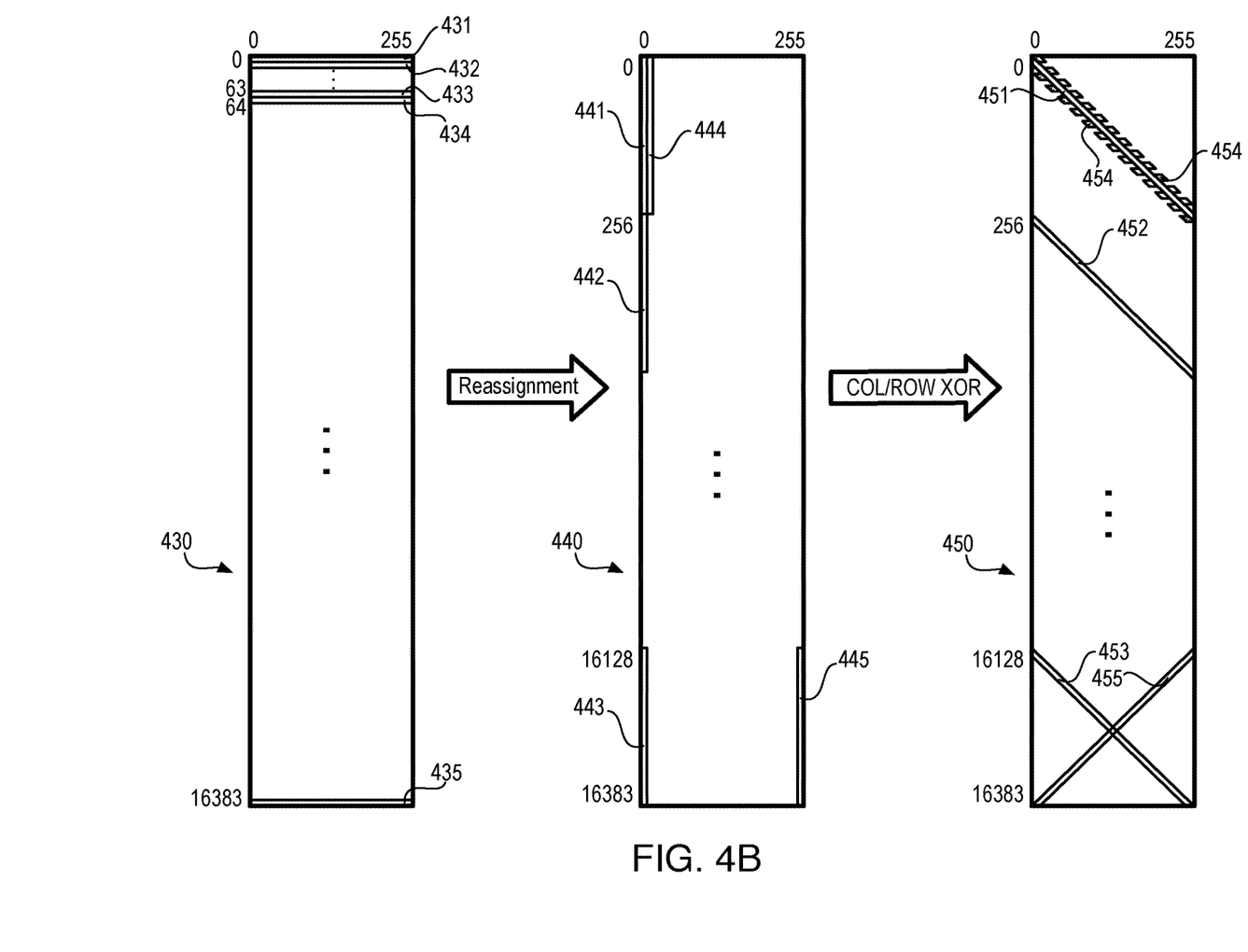
FIG. 4B illustrates the effect of the address mapping on a memory map.

FIG. 4B contains three memory maps 430, 440, 450 to illustrate address mapping performed by the address mapping embodiment 410 of FIG. 4A. Each memory map shows a memory layout (not to scale) that has 256 ($2^8$) addressable columns and 16,384 ($2^{14}$) addressable rows.

Memory map 430 illustrates a traditional memory layout, as memory would be accessed with input address 402 of FIG. 4A. As a memory address is incremented from 0 (for a constant block address), the first 256 memory addresses map data range 431 to the first row of memory map 430, the next 256 memory addresses map data range 432 to the second row of memory map 430, etc., down to the last 256 memory addresses, which map data range 435 to the last row of memory map 430. Two other data ranges of interest for this illustration, 433 and 434, map respectively to the $63^{rd}$ and $64^{th}$ rows of memory map 430. With memory map 430, an application that heavily accesses sequential addresses would in effect repeatedly address a small number of physical rows in memory map 430.

Memory map 440 illustrates changes to the memory layout with row/column bit position reassignment as shown in FIG. 4A. Data ranges that previously mapped to locations 431, 432, 433, 434, and 435 in memory map 430 now map, respectively, to locations 441, 442, 443, 444, and 445 in memory map 440. Thus, as addresses are incremented, data first fills the first column of memory map 440 top to bottom, then starts at the top of the second column and fills down, etc. With memory map 440, an application that heavily accesses sequential addresses would in effect repeatedly address a small number of physical columns in memory map 440.

Memory map 450 illustrates further changes to the memory layout with the column address determined by an XOR operation as shown in FIG. 4A. Data ranges that previously mapped to locations 441, 442, 443, 444, and 445 in memory map 440 now map, respectively, to locations 451, 452, 453, 454, and 455 in memory map 450. In memory map 450, the row of each mapped address is the same as the row of memory map 440. The column mapping, however, follows a pattern that repeats every 256 memory addresses (as this is the map row length). In this pattern, the first column of map 440 maps to diagonal stripes (e.g., 451, 452, 453) in map 450. The second column of map 440 maps to diagonal segmented stripes (e.g., 454) that straddle the first column stripes. As column in map 440 is incremented, the straddle pattern continues to shift and spread, and then reverse and contract, until the last column is reached, where the straddle pattern appears in map 450 as reversed diagonal stripes (e.g., 455; although stripes 453 and 455 as illustrated cross, they do not physically address the same memory location). With memory map 450, an application that heavily accesses sequential addresses would in effect potentially address data on every row and every column in memory map 450. Other patterns and other pattern characteristics can be obtained by changing the application of the logic function to the input memory address.

Referring again to FIG. 3, the reassignment of address bits in operation 302 may be discontinuous instead of continuous as shown in FIG. 4A. For example, the $6^{th}$ through $13^{th}$ and $17^{th}$ through $22^{nd}$ bits in a 28-bit input memory address may be reassigned to the row address, and the $14^{th}$ through $16^{th}$ and $23^{rd}$ through $27^{th}$ bits in the 28-bit input memory address may be reassigned to the column address, in operation 302. In this example, some of the address bits (i.e., the $17^{th}$ through $22^{nd}$) in the row address are more significant bits in the mapped memory address than some of the address bits (i.e., the $14^{th}$ through the $16^{th}$ bits) in the column address.

In another embodiment of operation 302, the address bits in the row address are swapped with the address bits in the column address for each input memory address in the set of requests to access a memory circuit. After operation 302, the address bits of the column address are more significant bits than the address bits of the row address in each of the mapped memory addresses. Subsequently, at least a subset of the address bits of the column address are reassigned as the row address of the mapped memory address, and at least a subset of the address bits of the row address are reassigned as the column address of the mapped memory address.

In some embodiments, when stepping through consecutive data locations in a processor memory space, the memory controller or processor circuit toggles the address bits of the column addresses in the input memory addresses more frequently than the address bits of the row addresses. In these embodiments, reassigning the column address as the row address for each input memory address causes the address bits of the row address to be more toggled than the address bits of the column address.

Figure 5:
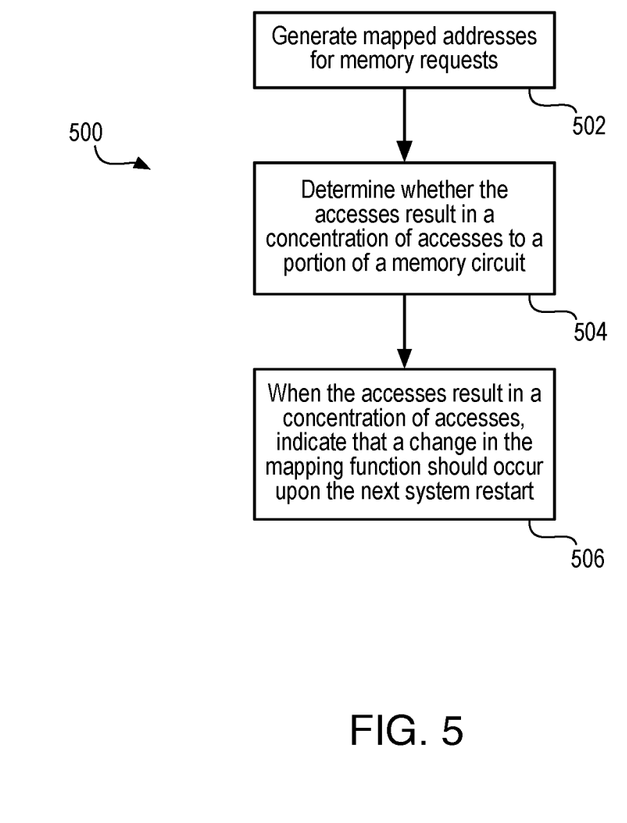
FIG. 5 is a flow chart illustrating operations that are performed on addresses for requests to access a memory circuit to determine when the resulting physical addresses identify memory cells that are clustered together in small portion of the memory circuit.

It is conceivable that a given data process could access its memory space in an unusual way such that a given mapping scheme results in an unintended concentration of accesses to one region of physical memory. FIG. 5 contains a flow chart 500 for an embodiment, including operations that are performed for requests to access a memory circuit to determine when the resulting physical addresses identify memory cells that are clustered together in a small portion of the memory circuit. In the embodiment of FIG. 5, input memory addresses that are part of a set of requests to access a memory circuit are received in the memory controller circuit. Each of the input memory addresses has a row address and a column address. Each of the requests to access the memory circuit includes an input memory address.

The memory controller circuit or memory circuit performs address mapping operations, e.g., as described with respect to FIG. 3 for the input memory address included with each request, as shown in operation 502. In an operation 504, the memory controller circuit or the memory circuit determines if the mapped memory addresses generated in operation 502 identify memory cells that are clustered together in a small portion of the memory circuit.

When a significant number of memory accesses tend to concentrate to a limited portion of a memory circuit, an operation 506 creates an event to indicate that a different mapping function strategy is warranted. The event can alert, e.g., a system administrator, operating system, a memory controller, etc., to change strategy upon the next system restart. Upon the next restart, a different mapping in instituted. For instance, XOR operations with different bit combinations can select both row and column, different bit reassignments can be initiated, etc.

Figure 6:
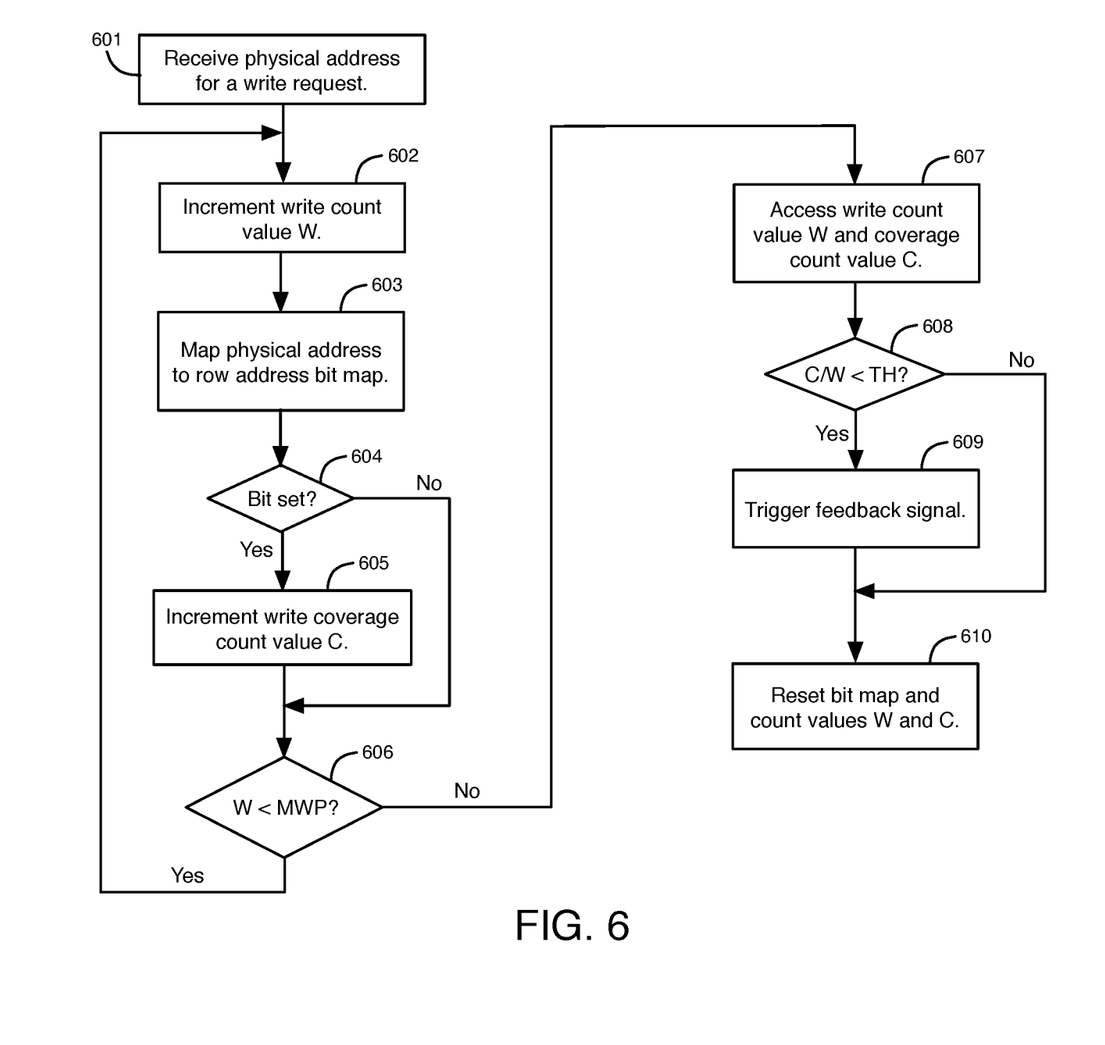
FIG. 6 is a flow chart illustrating operations that determine if physical addresses associated with requests to access a memory circuit identify less than a threshold number of rows in the memory circuit.

FIG. 6 contains a flow chart illustrating operations that determine if physical addresses associated with requests to access a memory circuit identify less than a threshold number of rows in the memory circuit. If the physical addresses identify less than the threshold number of rows in the memory circuit, different operations are applied to the physical addresses. The operations shown in FIG. 6 can, for example, be performed to implement operation 504 in FIG. 5.

In the embodiment of FIG. 6, physical addresses are first generated from input memory addresses using, e.g., operations 301-303, with or without added wear leveling operations. Each of the input memory addresses is associated with a write request to write data to a memory circuit. The operations of FIG. 6 track physical addresses associated with write requests. The operations of FIG. 6 may, for example, be performed by a hot region guard circuit in the memory controller circuit or in the memory circuit. In one embodiment, the operations of FIG. 6 are performed only on write requests to one bank in the memory circuit under the assumption that all banks are accessed with fairly similar access patterns.

A physical address associated with a write request to write data to the memory circuit is received after mapping/wear leveling calculations in operation 601. In operation 602, a write count value W is incremented by one in response to receiving the physical address associated with the write request. In operation 603, the physical address associated with the write request is mapped to a row address bit map. The row address bit map indicates which of the rows in the memory circuit have been identified by the physical addresses associated with the tracked set of write requests to write data to the memory circuit. The row address bit map includes one bit for each row within an address range in the memory circuit.

If the physical address received in operation 601 includes a row address that has not been part of one of the other physical addresses already processed by the operations of FIG. 6, then a bit is set in the row address bit map for the new row identified by that row address. If the physical address received in operation 601 includes a row address that has been part of one of the other physical addresses already processed by the operations of FIG. 6, then no additional bits are set in the row address bit map. Thus, an additional bit is set in the row address bit map for a new row each time one of the physical addresses includes a row address that has not appeared in one of the other physical addresses previously processed.

Decision operation 604 determines if a bit has been set for a new row in the row address bit map. If a bit for a new row in the row address bit map is set in operation 603, then decision operation 604 directs the processing of FIG. 6 to operation 605. In operation 605, a coverage count value C is incremented by one in response to the bit for the new row being set in the row address bit map. The coverage count value C records the number of unique rows that have been identified by the physical addresses associated with the write requests. The write count value W and the coverage count value C are stored in memory, e.g., registers associated with a hot block detection function.

If a bit has not been set for a new row in the row address bit map in operation 603, then decision operation 604 directs the processing of FIG. 6 to operation 606, skipping operation 605. The processing of FIG. 6 also proceeds to operation 606 after performing operation 605. In decision operation 606, the write count value W is compared to the maximum number of writes in a period (MWP). As an example, the maximum number of writes in a period can be set to any desired value. For instance, MWP could equal the number of rows tracked. If the write count value W is less than the maximum number of writes in a period in decision operation 606, then the processing of FIG. 6 returns to operation 602. If the write count value W is not less than the maximum number of writes in a period in decision operation 606, then the processing of FIG. 6 proceeds to operation 607. In an alternative embodiment, a timer is used to determine when to proceed to operation 607, instead of comparing the number of write requests to a maximum value.

In operation 607, the write count value W and the coverage count value C are accessed from memory. At operation 607, the write count value W is a statistic representing the number of write requests that were processed in the iterations of operations 602-606, and the coverage count value C is a statistic representing the number of unique rows written to in response to the write requests. In an alternative embodiment, the coverage count value C is calculated in operation 607 from the stored row address bit map instead of being incremented in each iteration of step 605.

In decision operation 608, the coverage count value C is divided by the write count value W to generate a quotient Q (i.e., Q=C/W), and the quotient Q is compared to a threshold number TH. If the quotient Q is less than the threshold number TH in decision operation 608, then decision operation 608 directs the processing of FIG. 6 to operation 609. In operation 609, a feedback signal FB is triggered to indicate that the physical addresses processed in the operations of FIG. 6 identified less than the threshold number TH of rows in the memory circuit. Feedback signal FB can flag the condition to the operating system, an administrator, or a boot-accessible register, for example, such that a different mapping function can be selected upon the next memory system restart.

If the quotient Q is not less than the threshold number TH in decision operation 608, then decision operation 608 directs the processing of FIG. 6 to operation 610, skipping operation 609.

After operation 609, the processing of FIG. 6 also proceeds to operation 610. In operation 610, the bits in the row address bit map are reset, the coverage count value C is reset to zero, and the write count value W is reset to zero. The operations of FIG. 6 can then be repeated for a new set of write requests to the memory circuit.

In an alternative embodiment, the write count value W and the coverage count value C are added to long term summed statistics for the write count value and the coverage count value, respectively, that are accumulated over multiple iterations of operations 601-610. The long term summed statistics for the write and coverage count values are calculated in operation 607 and used for the comparison in operation 608.

Figure 7A:
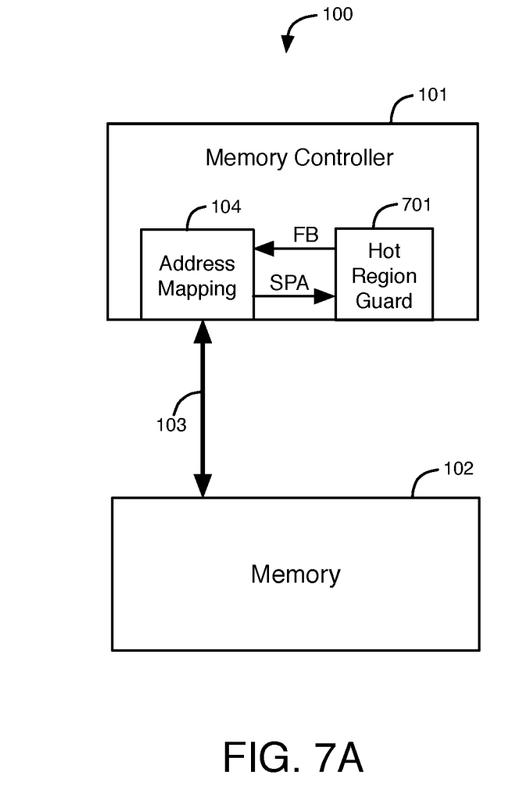
FIG. 7A illustrates an embodiment of a memory system having a hot region guard circuit in the memory controller circuit.

FIG. 7A illustrates an embodiment of memory system 100 having a hot region guard circuit in the memory controller circuit. Memory system 100 includes memory controller circuit 101 and memory circuit 102. Memory controller circuit 101 includes address mapping circuit 104 and hot region guard circuit 701. Address mapping circuit 104 provides the physical addresses SPA (e.g., mapped memory addresses generated in operations 301-303) to hot region guard circuit 701. Hot region guard circuit 701 provides the feedback signal FB to address mapping circuit 104 during operation 609, as described with respect to FIG. 6, to indicate when the physical addresses identify less than the threshold number TH of rows in memory circuit 102. Address mapping circuit 104 operates as described above, for example, with respect to FIGS. 2, 3, and 4A-4B.

Figure 7B:
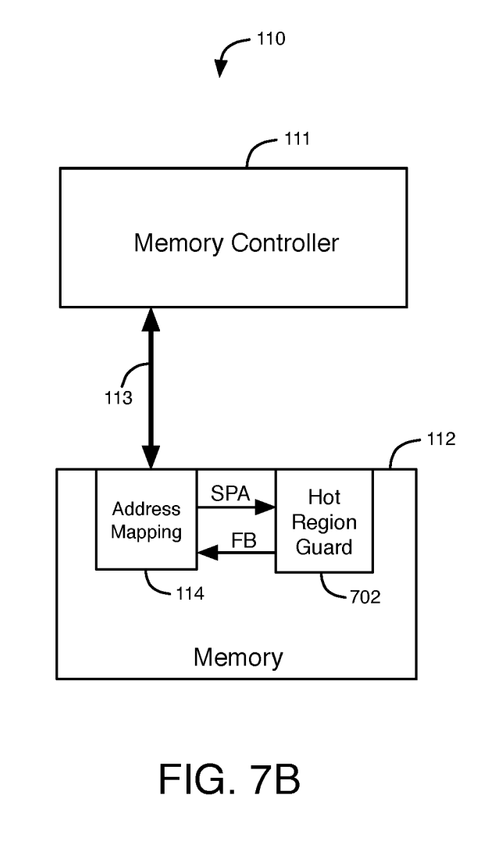
FIG. 7B illustrates an embodiment of a memory system having a hot region guard circuit in the memory circuit.

FIG. 7B illustrates an embodiment of memory system 110 having a hot region guard circuit in the memory circuit. Memory system 110 includes memory controller circuit 111 and memory circuit 112. Memory circuit 112 includes address mapping circuit 114 and hot region guard circuit 702. Address mapping circuit 114 provides the physical addresses SPA (e.g., mapped memory addresses generated in operations 301-303) to hot region guard circuit 702. Hot region guard circuit 702 provides the feedback signal FB to address mapping circuit 114 during operation 609, as described with respect to FIG. 6, to indicate when the physical addresses identify less than the threshold number TH of rows in the memory circuit 112. Address mapping circuit 114 operates as described above, for example, with respect to FIGS. 2, 3, and 4A-4B. Hot region guard circuits 701 and 702 and address mapping circuits 104 and 114 may each include circuitry designed for the particular functions described herein, programmable circuits, software, or a combination of these.

According to an embodiment, a method comprises receiving an input memory address comprising a first set of address bits at an address mapping circuit. The method also comprises applying a logic function to the input memory address to generate a mapped memory address using the address mapping circuit. The logic function uses at least a subset of the first set of address bits in two separate operations that respectively determine first and second portions of the mapped memory address.

According to another embodiment, a memory controller device comprises an address mapping circuit to receive an input memory address comprising a first set of address bits. The address mapping circuit applies a logic function to the input memory address to generate a mapped memory address. The logic function uses at least a subset of the first set of address bits in two separate operations that respectively determine first and second portions of the mapped memory address.

The foregoing description of the exemplary embodiments has been presented for the purposes of illustration and description. The foregoing description is not intended to be exhaustive or limiting to the examples disclosed herein. In some instances, certain features of the embodiments can be employed without a corresponding use of other features as set forth. Many modifications, substitutions, and variations are possible in light of the above teachings, without departing from the scope of the claims.

What is claimed is:
1. A memory device, comprising:
an input interface to receive an input memory address from an integrated circuit (IC) memory controller; and
an address mapping circuit coupled to the input interface and to receive the input memory address from the input interface, the input memory address comprising a first bit group indicating an input row address and a second bit group indicating an input column address, the address mapping circuit applying a logic function to at least a portion of the input row address and at least a portion of the input column address, in a first operation, to generate a mapped column address, the address mapping circuit, in a second operation, to reassign the input column address as a mapped row address.

2. The memory device of claim 1, wherein:
bit contents of the input column address are unchanged for both the first and second operations.

3. The memory device of claim 1, wherein:
the mapped column address comprises a most significant bit group of the mapped memory address.

4. The memory device of claim 1, further comprising:
a wear leveling function to generate a wear-leveled memory address from at least one of the input memory address and the mapped memory address.

5. The memory device of claim 1, further comprising:
a wear leveling function operating on the second bit group of the input memory address in parallel with the address mapping circuit.

6. The memory device of claim 1, wherein the logic function comprises an XOR function that generates the bit contents for the mapped memory address as an XOR output.

7. The memory device of claim 1, wherein the logic function comprises a circular arithmetic shift function of a partial address comprising a first portion of the first bit group, and wherein a value of the shift that the circular arithmetic shift function applies to the partial address is a function of a second portion of the first bit group.

8. A method of operating a memory device, comprising:
receiving an input memory address from an integrated circuit (IC) memory controller via an input interface, the input memory address comprising a first bit group indicating a row address and a second bit group indicating a column address;
in a first operation, applying a logic function to at least a portion of the input row address and at least a portion of the input column address, with an address mapping circuit, to generate a mapped column address; and
in a second operation, reassigning the input column address as a mapped row address, with the address mapping circuit.

9. The method of claim 8, further comprising:
maintaining the contents of the input column address in an unchanged state for both the first and second operations.

10. The method of claim 8, wherein the reassigning the input column address as a mapped column address comprises:
assigning the mapped column address as a most significant bit group of the mapped memory address.

11. The method of claim 8, further comprising:
generating a wear-leveled memory address with a wear leveling function from at least one of the input memory address and the mapped memory address.

12. The method of claim 8, further comprising:
generating a wear-leveled memory address with a wear leveling function operating on the second bit group of the input memory address in parallel with the address mapping circuit.

13. The method of claim 8, wherein applying the logic function comprises:
generating the bit contents of the mapped memory address as an XOR function output from the at least a portion of the first bit group and at least a portion of the second bit group.

14. The method of claim 8, wherein applying the logic function comprises:
applying a circular arithmetic shift function of a partial address comprising a first portion of the first bit group, and wherein a value of the shift that the circular arithmetic shift function applies to the partial address is a function of a second portion of the first bit group.

15. An integrated circuit (IC) chip, comprising:
memory device circuitry including
an input interface to receive an input memory address from an integrated circuit (IC) memory controller; and
an address mapping circuit coupled to the input interface and to receive the input memory address comprising a first bit group indicating a row address and a second bit group indicating a column address, the address mapping circuit applying a logic function to at least a portion of the input row address and at least a portion of the input column address in a first operation to generate a mapped column address, the address mapping circuit, in a second operation, to reassign the input column address as a mapped row address.

16. The IC chip of claim 15, wherein:
the contents of the input column address are unchanged for both the first and second operations.

17. The IC chip of claim 15, wherein:
the mapped column address comprises a most significant bit group of the mapped memory address.

18. The IC chip of claim 15, further comprising:
a wear leveling function to generate a wear-leveled memory address from at least one of the input memory address and the mapped memory address.

19. The IC chip of claim 15, further comprising:
a wear leveling function operating on the second bit group of the input memory address in parallel with the address mapping circuit.

20. The IC chip of claim 15, wherein:
the logic function comprises an XOR function that generates the bit contents of the mapped memory address as an XOR output of first and second subsets of selected bits from the first bit group.

* * * * *